May 19, 1931.  C. C. WILLIAMS  1,806,230
VALVE ACTUATING MECHANISM
Filed Sept. 6, 1928    2 Sheets-Sheet 2
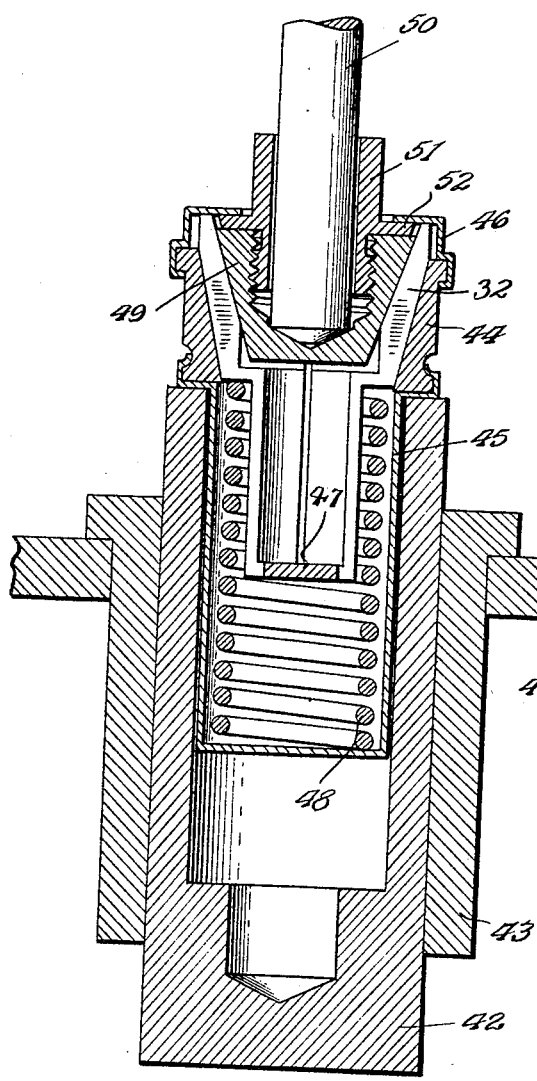
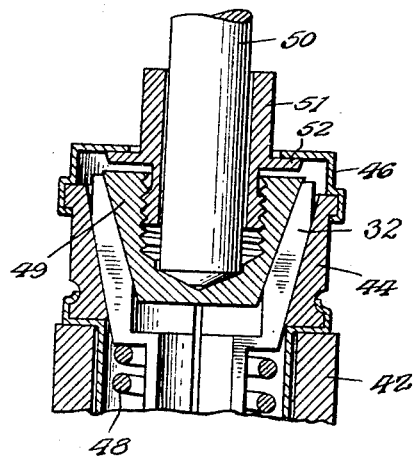
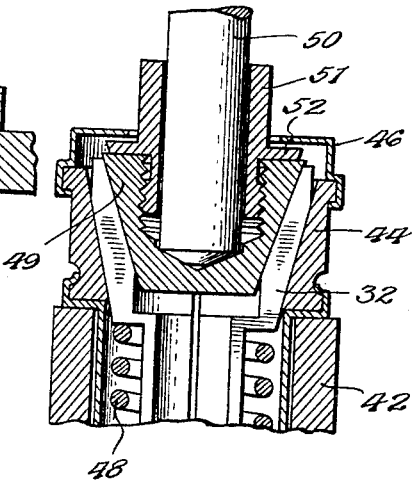
C. C. Williams.
INVENTOR.
BY Lacey & Lacey,
ATTORNEYS Patented May 19, 1931

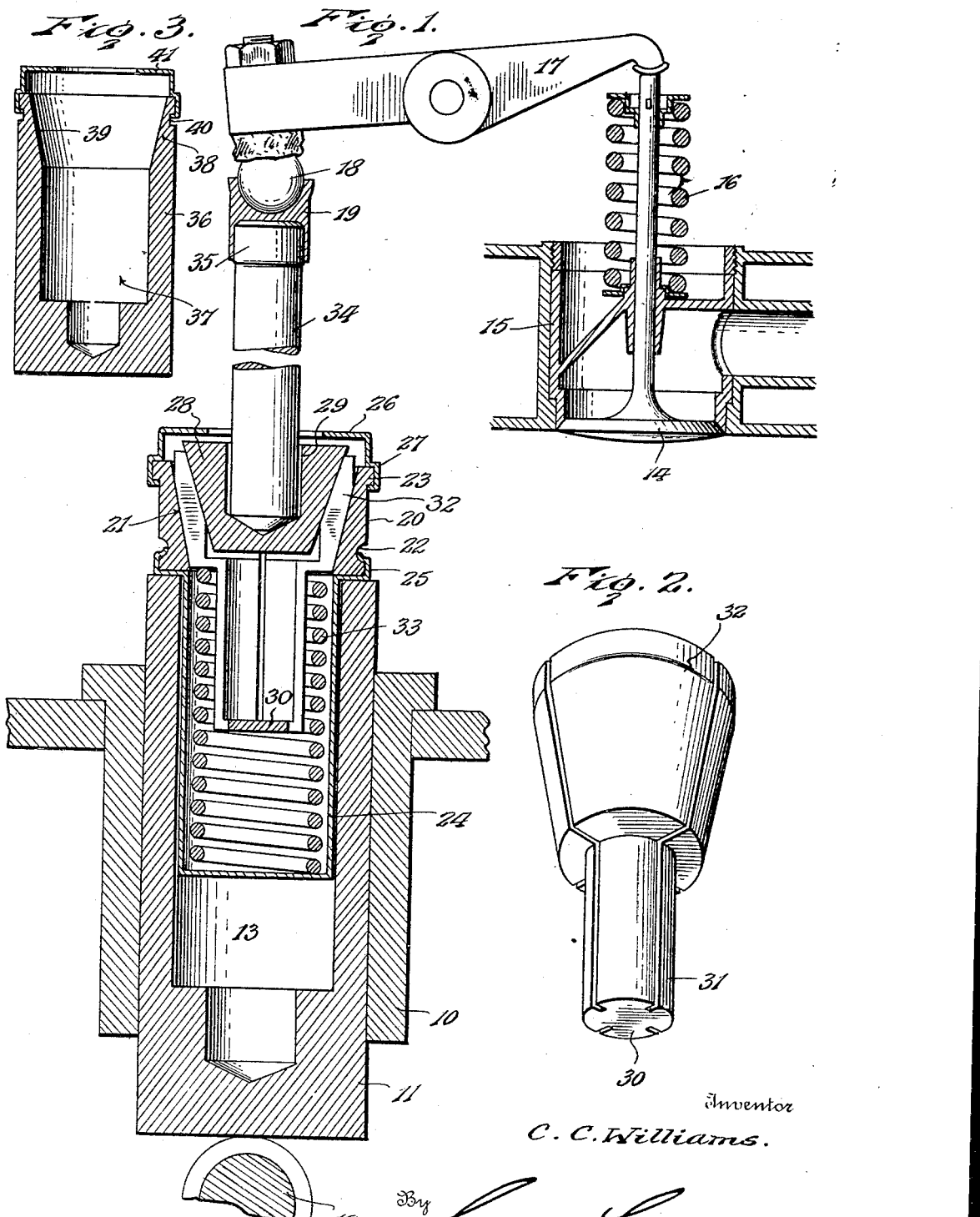

1,806,230

UNITED STATES PATENT OFFICE

CALVIN C. WILLIAMS, OF PHILADELPHIA, PENNSYLVANIA

VALVE ACTUATING MECHANISM

Application filed September 6, 1928. Serial No. 304,370.

This invention relates to an improved valve actuating mechanism of the general character disclosed in my co-pending applications for a similar invention filed of even date herewith, Ser. No. 304,369, and Ser. No. 304,371.

The invention seeks, among other objects, to provide a mechanism including a push rod incorporating a novel slip joint automatically operable to accommodate lengthening or shortening of the rod; to provide a mechanism capable of prolonged service and to provide a mechanism which will be characterized by structural simplicity and which may be readily installed.

Other objects of the invention not mentioned in the foregoing will appear during the course of the following description.

In the drawings:

Figure 1 is a vertical sectional view showing my improved mechanism in connection with a conventional overhead valve.

Figure 2 is a detail perspective view of the floating clutch member of the slip joint employed.

Figure 3 is a vertical sectional view showing a slight modification of the invention.

Figure 4 is a fragmentary vertical sectional view showing a further modification of the invention and illustrating the parts as initially installed.

Figure 5 is a fragmentary sectional view showing the manner in which the slip joint of the modification of Figure 4 may be adjusted to effect subsequent shortening of the push rod.

Figure 6 is a fragmentary sectional view showing the position of the parts of this latter modification after the shortening of the push rod has been effected.

Referring more particularly to the drawings, I have shown a fixed tappet guide at 10, and slidable through said guide is a tappet 11, operable by a cam shaft 12, the tappet being provided with the customary axial recess 13. A conventional overhead valve of an internal combustion engine is indicated at 14 and slidably supporting the valve is a cage 15, the valve being normally held closed by a spring 16. Mounted to coact with the upper end of the valve stem is a rocker 17 carrying an adjustable ball 18, and formed to coact with said ball is a socket 19.

In carrying the invention into effect, I employ a push rod in which is incorporated a novel slip joint. This joint includes a female clutch member in the form of a clutch cup 20 having a conical inner face 21. The cup is open at its ends and surrounding the cup near its lower extremity is an external groove 22, while near its upper end, the cup is provided with an annular overhanging flange 23. Attached to the cup at its lower end is a depending socket 24 offset near its upper end and provided with a flange 25 which is rolled into the groove 22 for rigidly connecting the socket with the cup. The socket more or less freely fits within the recess 13 of the tappet 11 for centering the clutch cup with respect to the tappet while the offset near the upper end of the socket rests flat against the upper end face of the tappet. Fixed to the cup 20 at its upper end is an upstanding cap or housing 26 provided at its lower end with a channel member 27 snugly embracing the flange 23 for connecting the cap with the cup.

Housed by the cap 26 is a conical male clutch member or cone 28 which extends into the female clutch cup 20 axially thereof, and formed in the member 28 is an axial socket or recess 29.

Formed to coact with the clutch members 20 and 28 is an inverted floating clutch member 30. As shown in detail in Figure 2, the clutch member 30 is formed with a tubular body offset near one end and slotted throughout its length to provide a plurality of elongated spring tongues 31, the small end of the body being closed. Formed on said tongues at the offset end of the body are substantially wedge-shaped elements 32 defining an intermediate conical clutch cup. The outer faces of these elements are inclined to seat flat against the conical inner face 21 of the clutch cup 20, while the inner faces of said elements are inclined to seat flat against the conical outer face of the male clutch member 28, the outer inclined faces of said elements being longer than the inner faces. In the present instance, I have shown the clutch member slotted at four equi-distant points but, of course, this detail may be varied as desired. Freely surrounding the smaller end portion of the body of the floating clutch member 30 is a spring 33, one end of which rests against the bottom wall of the socket 24 while the opposite end of said spring bears against the offset in said body for urging the floating clutch member upwardly. This spring is, of course, of far less strength than the valve spring 16.

Extending freely through the top wall of the cap 26 of the female clutch member is a push rod element 34 which freely fits within the socket 29 of the male clutch member 28, and formed on the upper end of said element is a head 35 over which the socket 19 snugly fits.

As will be observed, the male clutch member 28 and associated parts are enclosed by the female clutch member 20 and cap 26 to provide a permanently assembled slip joint which is separate and distinct from the other parts of the mechanism. Accordingly, when installing the mechanism, the slip joint may be first connected with the tappet 11, when the push rod element 34 may be inserted at its lower end into the male clutch member 28 and the socket 19 disposed over the head 35 to coact with the ball 18.

Assuming now that the tappet 11 is being raised, the upward thrust or jar of the tappet will, as will be observed, be transmitted directly to the clutch elements 32 and, of course, at the instant such upward thrust is transmitted to said elements, the valve 14, spring 16, rocker 17 and push rod element 34 will be at rest. Accordingly, the inertia of these parts will be sufficient to maintain the push rod element stationary momentarily and oppose the upward thrust or jar of the tappet with sufficient force to cause upward movement of the clutch cup 20 with a coincident downward endwise slipping of the clutch elements 32 independently of the clutch member 28. The spring 33 is therefore compressed and due to the difference in the angularity of the clutch face 21 of the cup and the face of the male clutch member, the clutch elements are, of course, independently shifted downwardly a distance greater than the independent upward movement of the clutch cup. The push rod is thus automatically contracted, but as the tappet continues in its upward movement and the inertia of the push rod element, rocker and valve is overcome, the downward slipping of the clutch elements 32 is arrested substantially at the instant the push rod element begins to yield to the upward movement of the tappet, when said elements wedge between the clutch face 21 of the cup and the male clutch member 28 to provide a rigid connection between said cup and the push rod element so that the valve is opened.

Due to the automatic contraction of the push rod as the valve is opened, the opening travel imparted to the valve will be correspondingly shortened. Accordingly, upon the return of the tappet downwardly, the valve will seat before the tappet reaches the bottom of its throw so that the push rod element 34 will be relieved of the downward pressure otherwise exerted thereon by the valve spring 16. As a result, the spring 33 will, as the tappet completes its downward movement, expand for again shifting the clutch elements 32 upwardly within the clutch cup 20 and thus lift the push rod element so that the parts will be returned to their original positions, while all looseness between the parts will be automatically taken up. Rattling will thus be effectually prevented. Should the valve fail to seat properly, the push rod will, as will be understood in view of the foregoing description, be permitted to automatically expand to compensate for the shortened closing travel of the valve while, when the valve is subsequently permitted to move into engagement with its seat, the repeated jarring communicated from the tappet to the clutch elements, incident to the actuation of the tappet, will cause said elements to slip so that the push rod will be caused to automatically contract to compensate for the increased closing travel of the valve.

Attention is now directed to the fact that by employing a floating clutch member of the character described, the clutch elements 32 are so shaped as to provide large bearing areas to coact not only with the clutch cup 20 but also with the clutch member 28. Premature wear of all of these parts will thus be obviated. Furthermore, as will be perceived, the clutch elements 32 will always be supported as regards each other, at the same elevation between the clutch members 20 and 28 and no one of said elements can slip downwardly to unduly wedge said members apart and impair the coaction of the remainder of said elements with said members. As previously intimated, the body of the floating clutch member 30 is formed of resilient material and the tongues 31 are of such length that as the clutch elements move downwardly from the position shown in Figure 1, between the clutch members 20 and 28, said tongues will bow longitudinally so as to permit the inclined faces of said elements to always seat flat against the beveled faces of said members. A like flexing of the spring tongues will of course obtain as the clutch elements 32 are shifted upwardly so that the advantage of the full bearing area presented by the inclined faces of said elements will, at all times, be realized.

In Figure 3 of the drawings, I have illustrated a slight modification of the invention especially adapted to be incorporated in an engine structure at the time of manufacture thereof. In accordance with this modification, the engine tappet 36 is provided with an axial recess 37 and is machined out at its upper end to form a female clutch member or cup 38 having a conical inner face 39 corresponding to the face 21 of the cup 20. Externally, the cup 38 is provided with an encircling groove 40, and tightly engaging at its lower margin in said groove is a cap 41 corresponding to the cap 26. Otherwise, the modified structure is identical with the preferred form of the invention and it is accordingly believed that the manner of operation thereof will, from the foregoing description, be well understood.

When installing the push rod of Figure 1, it is necessary, after the parts have been arranged in proper position, to operate the engine sufficiently to cause the slip joints of the several push rods of the engine to effect shortening of the rods. This is necessary in order that the floating clutch member 30 may be caused to assume the position illustrated in Figure 1, since it is necessary that the floating clutch member be permitted an upward movement as well as a downward movement, it being understood, of course, that the spring 33 will, before the joint is installed, normally hold the clutch member against the cap 26. After the shortening operation has been completed, the ball 18 is adjusted downwardly to take up the shortening of the rod so that when the valve 14 is closed the parts will stand in the position illustrated.

In Figures 4, 5 and 6 of the drawings, I have illustrated a modification of the invention wherein a preliminary operation of the engine to effect initial shortening of the push rods, as just described, is eliminated. An engine tappet is shown at 42 and the tappet guide at 43. The female clutch member or cup of the joint is indicated at 44, the socket at 45, and the cap at 46. The floating clutch member of the joint is indicated at 47, the actuating spring for said member at 48, and the male clutch member at 49, while the push rod element is indicated at 50. All of these parts function like the corresponding parts of the form of the invention first described and, with the exception of the male clutch member, are identical in construction.

As illustrated, the wall of the socket of the male clutch member 49 is threaded, and screwed into said socket is a nut 51 which freely receives the push rod element therethrough and is provided with an annular radial flange 52 which projects beneath the top wall of the cap 46 to coact therewith. When the joint is initially installed, the floating clutch member 47 is, as shown in Figure 4, held against the top wall of the cap by the spring 48 and the floating clutch member acts on the male clutch member 49 for also holding the flange 52 tight against said top wall. To effect initial contraction of the slip joint and consequent shortening of the push rod, the push rod element 50 is then hammered downwardly until the male clutch member and floating clutch member assume the position shown in Figure 5. The nut 51 is then adjusted upwardly in the socket of the male clutch member until the flange 52 of said nut again abuts the top wall of the cap 46. Consequently, the nut will then coact with said flange for holding the slip joint contracted so that the adjustable ball, corresponding to the ball 18 shown in Figure 1, may be adjusted downwardly to take up the contraction of the joint. The adjustment of the ball being accomplished, the nut 51 is, as shown in Figure 6, adjusted downwardly on the male clutch member to its original position, when the clearance between the upper end of the floating clutch member and the top wall of the cap as well as between the flange 52 of the nut and said top wall will remain.

Having thus described the invention, I claim:

1. An automatic take-up device including nested conical clutch members comprising rigid inner and outer members and a coacting intermediate member movable axially between the inner and outer members, the intermediate clutch member including a plurality of clutch elements having flat contact with the inclined faces of the inner and outer members and shiftable for spacing said inner and outer members.

2. An automatic take-up device including nested conical clutch members comprising rigid inner and outer members and a coacting intermediate member movable axially between the inner and outer members, the intermediate clutch member including a plurality of clutch elements having flat contact with the inclined faces of the inner and outer members and shiftable for spacing said inner and outer members, and means yieldably connecting said elements with each other.

3. An automatic take-up device including nested conical clutch members comprising rigid inner and outer members and a coacting intermediate member movable axially between the inner and outer members, the intermediate clutch member including a plurality of clutch elements forming an inverted conical cup between the inner and outer members and having flat contact with the inclined faces thereof, said elements being shiftable for spacing said inner and outer members.

4. An automatic take-up device including nested conical clutch members comprising rigid inner and outer members and a coacting intermediate member movable axially between the inner and outer members, the intermediate clutch member including a body formed of spring tongues having clutch elements thereon to define a conical clutch cup between the inner and outer members, said elements having flat contact with the inclined faces of said inner and outer members and being shiftable for spacing said inner and outer members.

5. An automatic take-up device including nested conical clutch members comprising rigid inner and outer members and a coacting intermediate member movable axially between the inner and outer members, the intermediate clutch member including a body slotted to provide spring tongues thickened at their free ends to form clutch elements defining a conical clutch cup between said inner and outer members, said elements having flat contact with the inclined faces of said inner and outer members and being shiftable for spacing said inner and outer members.

6. An automatic take-up device including nested conical clutch members comprising rigid inner and outer members and a coacting intermediate member movable axially between the inner and outer members, the intermediate clutch member including a plurality of clutch elements defining a clutch cup between said inner and outer members and being thickened toward the smaller end of said cup to have flat contact with the inclined faces of said inner and outer members, means yieldably connecting said elements with each other, said elements being shiftable for spacing said inner and outer members, and means connected with the outer member and enclosing the remainder of the parts to provide a separate self-contained unit.

7. An automatic take-up device including nested conical clutch members comprising rigid inner and outer members and a coacting intermediate member movable axially between the inner and outer members, the intermediate clutch member including a body slotted to provide spring tongues having clutch elements formed thereon to define a clutch cup between said inner and outer members, said elements having flat contact with the inclined surfaces of said inner and outer members and being shiftable for spacing said inner and outer members, a spring acting on the intermediate clutch member and tending to shift same, and means connected to the outer member and enclosing the remainder of the parts to provide a self-contained unit.

8. An automatic take-up device including nested conical clutch members comprising rigid inner and outer members and a coacting intermediate member movable axially between the inner and outer members, the intermediate clutch member being depressible for spacing the inner and outer members, yieldable means resisting depression of said intermediate member, and adjustable means for initially limiting the return of said intermediate member when depressed.

9. An automatic take-up device including nested conical clutch members comprising rigid inner and outer members and a coacting intermediate member movable axially between the inner and outer members, the outer member providing a cup accommodating the other of said members and the intermediate member being depressible for spacing the inner and outer members, yieldable means resisting depression of the intermediate member and said inner member, a cap carried by said cup and providing a stop for said inner and intermediate members, and adjustable means carried by the inner member to coact with said cap for initially limiting the return of said intermediate and inner members when depressed.

10. An automatic take-up device including nested conical clutch members comprising rigid inner and outer members and a coacting intermediate member movable axially between the inner and outer members, the inner member being depressible, yieldable means acting on the intermediate member and tending to shift same for spacing the inner and outer members, a stop carried by the outer member, and a nut adjustable on the inner member to coact with said stop for initially limiting the inner member against return when depressed.

In testimony whereof I affix my signature.

CALVIN C. WILLIAMS. [L. S.]